H. A. W. SMITH.
RERAILER CLAMP.
APPLICATION FILED APR. 3, 1919.
1,325,808. Patented Dec. 23, 1919.
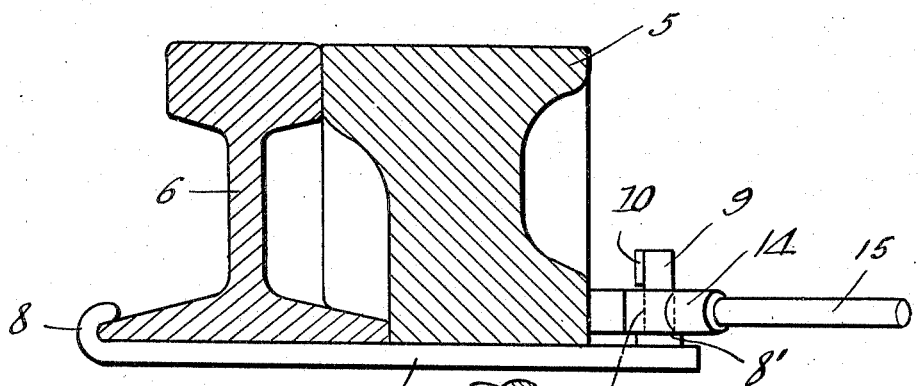
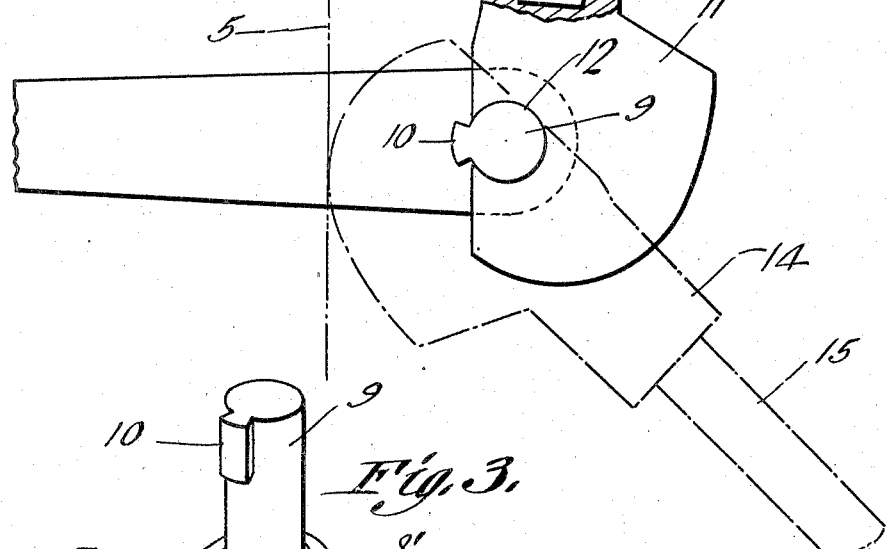
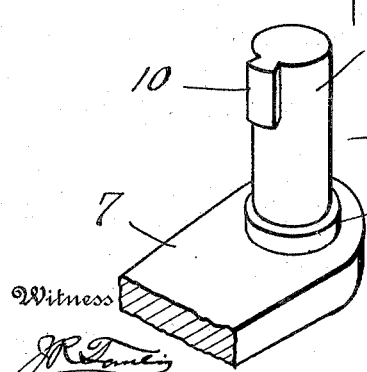
Inventor
H. A. W. Smith

UNITED STATES PATENT OFFICE.

HENRY A. W. SMITH, OF CHATHAM, VIRGINIA.

RERAILER-CLAMP.

1,325,808. Specification of Letters Patent. Patented Dec. 23, 1919.

Application filed April 3, 1919. Serial No. 287,109.

*To all whom it may concern:*

Be it known that I, HENRY A. W. SMITH, a citizen of the United States, residing at Chatham, in the county of Pittsylvania and State of Virginia, have invented a new and useful Rerailer-Clamp, of which the following is a specification.

My present invention relates to rerailers for railway cars and has as its primary object to provide a novel mechanism for clamping the rerailer to the rail.

Another object of the invention is to provide a clamp or fastener for rerailers which may be used in conjunction with any rerailer and which may be quickly engaged and disengaged therewith.

A further object of the invention resides in the provision of a device of the above character which is simple in construction, consists of few parts that may be readily assembled and disassembled, and which may be manufactured and sold at a minimum cost.

With the above and other objects and advantages in view, the invention consists of combinations of elements, arrangement of parts, details of construction, and general assemblage which will be hereinafter enlarged upon and pointed out in the appended claims.

On the drawing:

Figure 1 is an elevation of my improved rerailer fastener in operative position;

Fig. 2 is an elevation showing the device both in locked and unlocked position, a part of the device being broken away; and Fig. 3 is a fragmentary perspective of one of the parts of the device.

Referring in detail to the drawing the numeral 5 designates a rerailer of any preferred type and 6 the rail.

A clamping member is provided which comprises a shank 7 that is adapted to be placed beneath the rail. A rail engaging hook 8 is formed upon one end of the shank and engageable with the rail base.

Projecting laterally from one side of the shank 7 at its opposite end is a pin or key 9 having a locking lug 10 formed on its periphery at its outer end. Also formed on the key at its opposite end is an annular shoulder 8'.

In assembling the cam head with the pin, the open side of the opening 12 is alined with the lug 10 to permit this lug being inserted therethrough and the pin engaged in this opening 12. The lug 10 locks the cam against disengagement from the pin 9 when the open part of the opening 12 is not alined with this lug 10. The annular shoulder 8' spaces the cam head 11 from the shank 7 and permits the cam head to rotate freely on the key or pin 9. A handle socket 14 is formed on the cam head and receives a lever 15.

In the use of the device the hook of the shank 7 is engaged with the base of the rail, and the lever 15 moved around to wedge the cam head against the rerailer 5 to clamp the rerailer and rail together.

The embodiment of the invention here shown is considered the preferred construction but it is to be understood that the invention is susceptible to various modifications and that my limits of such modifications are only governed by the subjoined claims.

What is claimed is:

1. In a device of the character described a shank, a hook formed upon one end thereof and engageable with the base of the rail, a pin outstanding from the shank, a cam head adapted for engagement with a rerailer placed beside the rail and having an opening therein for receiving the pin, and a handle carried by the cam head, a locking lug formed upon the pin, the opening in the cam head being open upon one side and normally out of alinement with this lug to retain the cam head against disengagement from the pin.

2. In a device of the character described, a shank adapted to be arranged beneath the base of a rail, means for attaching the shank to the rail, a pin upstanding from one end of the shank, and a horizontally disposed cam head rotatable on the upstanding pin and engageable with one face of a rerailer arranged alongside the rail, and a handle connected with the cam head for moving the cam head into engagement with the rerailer to lock the latter against movement with respect to the rail.

In testimony that I claim the foregoing as my own, I have hereto affixed my signature in the presence of two witnesses.

HENRY A. W. SMITH.

Witnesses:
S. S. HURT,
E. E. FRIEND.